Aug. 10, 1948.  A. FISHKO  2,446,987
BUILDING CONSTRUCTION
Filed March 13, 1944  2 Sheets-Sheet 1
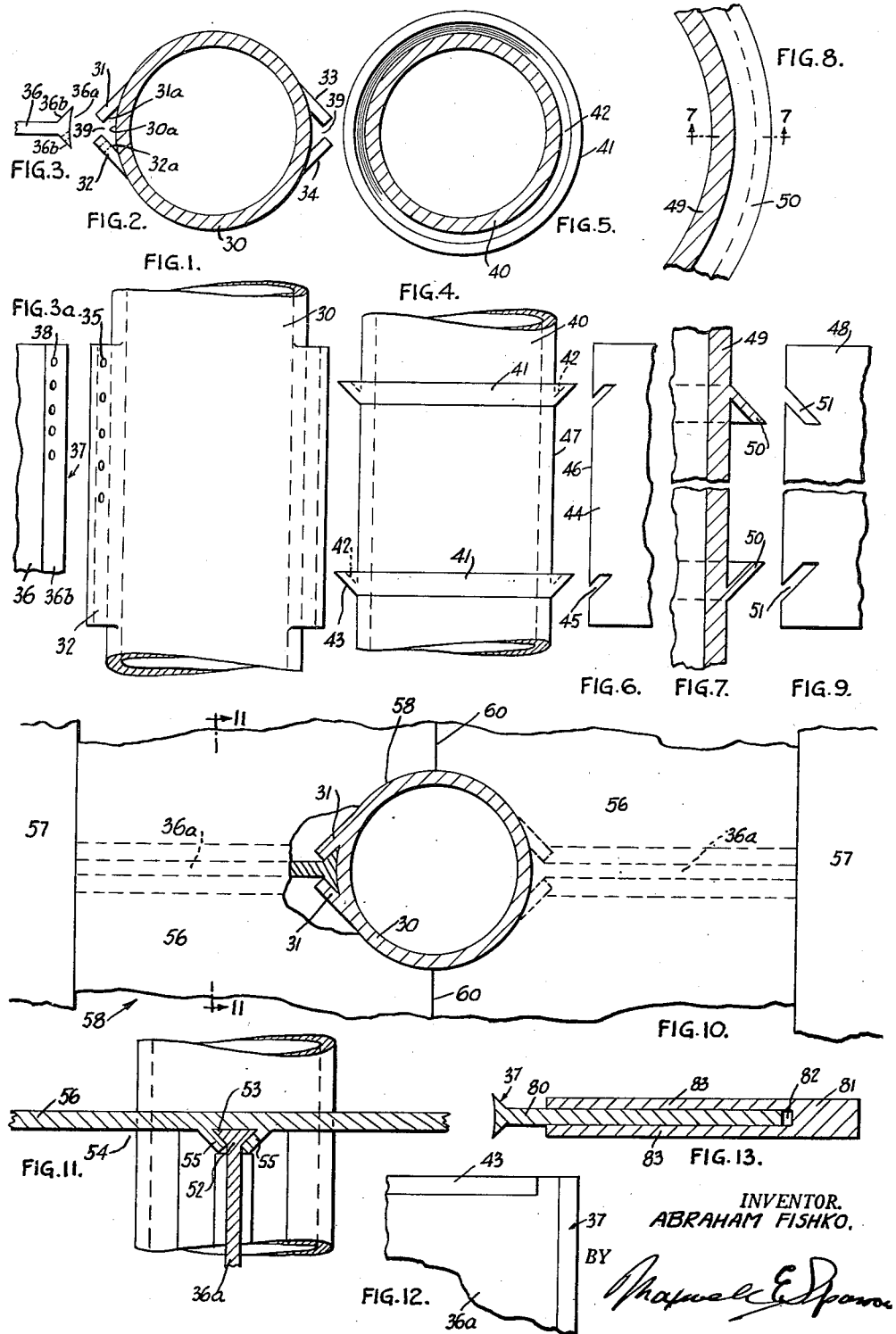
INVENTOR.
ABRAHAM FISHKO.
BY
ATTORNEY.

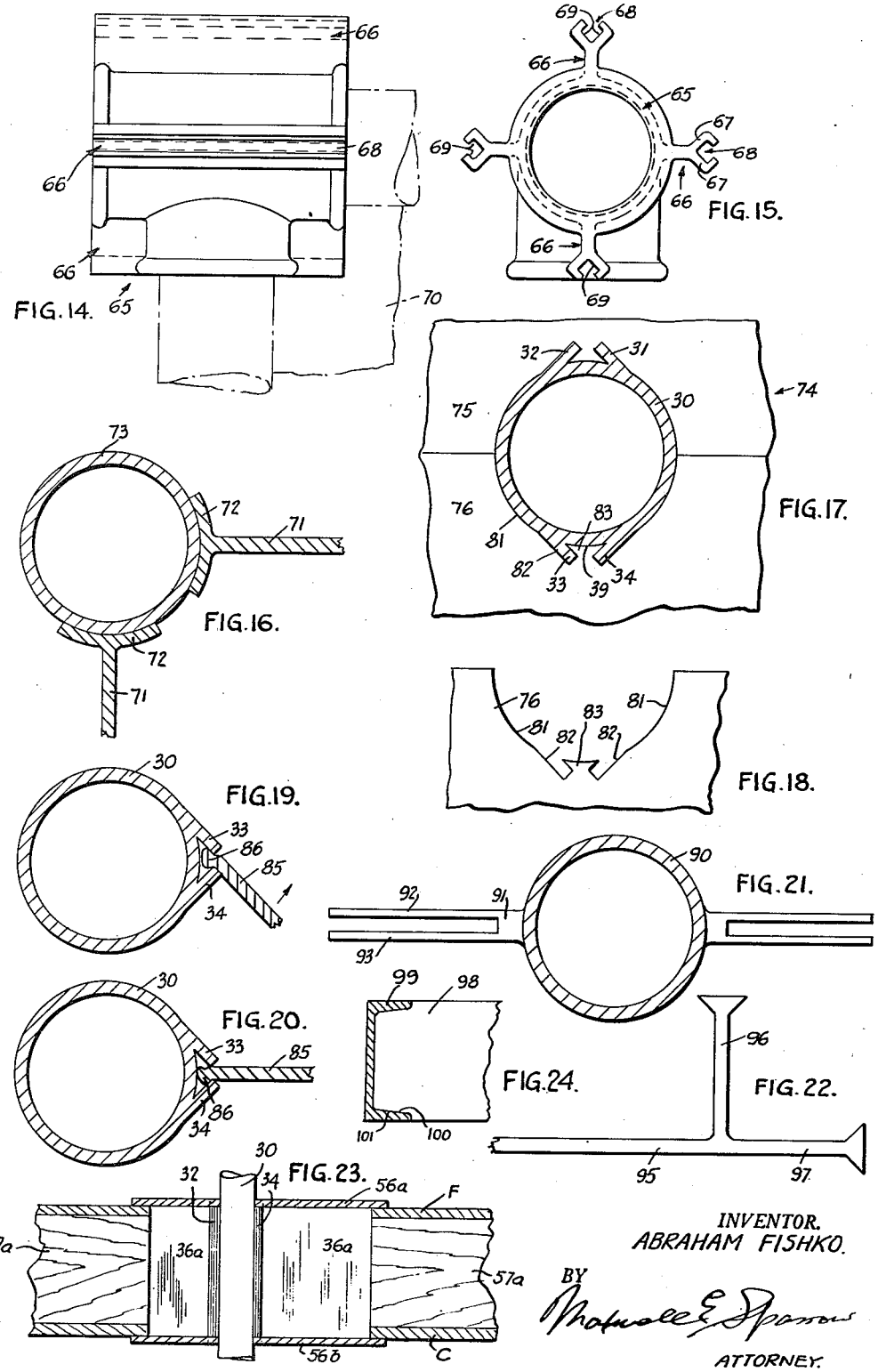

Patented Aug. 10, 1948

2,446,987

UNITED STATES PATENT OFFICE 2,446,987

BUILDING CONSTRUCTION

Abraham Fishko, Brooklyn, N. Y.

Application March 13, 1944, Serial No. 526,198

10 Claims. (Cl. 285—30)

1

This invention relates to improvements in devices for preventing fire, smoke, air drafts, vermin, water drippings and foreign matter, passing from one section of a structure to another particularly along pipe lines, pipe fittings and other obstructions which extend through openings in structures; and includes devices which were not particularly shown in my copending applications, Serial Numbers 413,592, (now Patent No. 2,343,896) and 523,033 and 523,069.

It is an object of the present invention to provide a closure or a partition in an opening in a structure through which an obstruction or member, such as, for example, a pipe line, pipe fitting or column passes, and in which the said obstruction is made part of the closure means or partition for said opening.

It is a further object of the present invention to provide the aforesaid obstruction or member with means whereby sectional plates or the like may be attached or secured thereto, whereby to constitute the plates and the obstruction, a unitary partition or other closure for an opening in a building or like structure.

Yet another object of the present invention is to provide closure means for an opening in construction work between joists, beams or the like through which opening an obstruction, such as, a pipe, pipe fitting, column or the like passes, the said closure means comprising a unitary assembly made up of sectional plates and the obstruction, for which purpose the obstruction and plates are provided with cooperating locking means.

A still further object of the present invention is to provide a close fit between the obstruction and abutting sectional plates; and a further object is to make said plates extensible.

Yet another object of the present invention is to provide for interlocking engagement between the aforesaid unitary assembly and other plate or plate-like members disposed at right angles to the aforesaid closure partition whereby the passage through and between the said adjacent joints, beams or the like, may be closed in all directions.

A still further object of the present invention is to provide wall or plate members forming part of the partition with portions engageable with the pipe element or the like.

These and other objects of the invention and the means for their attainment will be more apparent from the following detailed description, taken in connection with the accompanying drawings, illustrating certain embodiments of which the invention may be realized, and in which:

2

Fig. 1 is a side-elevational view (partly in section) of a portion of a pipe element incorporating the invention;

Fig. 2 is a top-plan view thereof;

Fig. 3 is a portion of a wall member or plate for abutting engagement with the element shown in Fig. 2;

Fig. 3a is a front-elevational view of Fig. 3;

Fig. 4 is a side-elevational view of a portion of a pipe element embodying the invention in a modified form;

Fig. 5 is a top plan view of Fig. 4;

Fig. 6 is a portion of a wall member or plate for abutting engagement with the pipe element shown in Fig. 4;

Fig. 7 is a fragmentary view of a side-wall portion of a pipe element embodying the invention in a further modified form and taken on line 7—7 of Fig. 8;

Fig. 8 is a top-plan view of Fig. 7;

Fig. 9 is a fragmentary view of a wall member or plate for abutting engagement with the pipe element shown in Fig. 7;

Fig. 10 is a top-plan view (partly in section) of a typical application of the invention;

Fig. 11 is a sectional view, taken along line 11—11 of Fig. 10;

Fig. 12 is a corner portion of a typical wall construction used in the embodiment shown in Fig. 11;

Fig. 13 is a cross-sectional view of an adjustable wall member;

Fig. 14 is a side-elevational view of a typical pipe fitting made in accordance with the invention;

Fig. 15 is an end elevation of Fig. 14;

Fig. 16 is a cross-sectional view of a pipe showing a modified form of wall member;

Fig. 17 is a typical cover plate used with the pipe element shown in Fig. 2;

Fig. 18 is a detail view of a cover plate section;

Fig. 19 is a transverse sectional view of a pipe and wall section in unlocked position;

Fig. 20 is a view similar to Fig. 19, showing the members in locked position;

Fig. 21 is a transverse sectional view of a pipe having extending arms to adjustably receive wall members;

Fig. 22 is a view (partly broken away) of a wall member having a branch lock portion; and Fig. 23 is a diagrammatic illustration (in section) showing a typical application in accordance with Figs. 1-3, inclusive.

Fig. 24 illustrates the application of a wall section employable in the invention, to an I-beam.

Reference will now be made more particularly to the drawings:

In Figs. 1 and 2, there is disclosed a pipe or tubular element 30 provided with two oppositely-disposed pairs of longitudinal spaced angular flanges 31, 32 and 33, 34. These flanges may form part of the pipe casting or may be either welded or riveted thereto. Flanges 31-34, inclusive, may be provided with a plurality of perforations 35. Although Figs. 1 and 2 show a pipe element, it is understood that this element may be a pipe-fitting, column or other obstruction which may exist in an opening in building or similar construction, which opening it is desired to close or to have formed therein a partition.

Cooperable with pipe element 30 are the plate or wall members 36 each having a flared end 37 adapted to slidingly fit into the channel or groove 39 to interlockingly engage the flanges 31, 32, or 33, 34, thus constituting the wall members 36 and pipe element, a built-up partition which may be disposed across the opening in, for example, a building shaft and between adjacent beams. The flared end 37 of wall member 36, may be provided with perforations 38. Perforations 38 are arranged closer together than perforations 35 so that when the member 36 is positioned in the channel or groove 39 there will be found that some of the perforations 38 will register with some of the perforations 35, so that pins may extend through these registered perforations for holding these members 36 in position during assembly. The abutting face 36a of flared end 37 is arcuate to conform to the curvature 30a of the external diameter of pipe element 30 and the angular faces 36b have the same slant as the inside wall 31a, 32a of flared end 37 to provide a close abutting joint between the wall members and pipe element.

Figs. 4-6, inclusive, disclose another means of locking wall members to the pipe element. The pipe element 40 is provided with spaced-annular flanges 41, angular in cross-section, each flange 41 forming with the pipe element 40 an annular groove 42, tapered in cross-section forming the annular wall 43. The partition sections or wall members 44 are each provided at one of their ends with angular slots 45 adapted to receive the angular walls 43 of the flanges 41. The depth and angle of the slots 45 are such that when engaged by the annular flanges 41, there will be abutting engagement between the end edge 46 and face 47 of the wall member and element 40, respectively.

Figs. 7-9, inclusive, show a construction similar to Figs. 4-6, except that the flanges 50 on pipe element 49 face each other and, consequently, the slots 51 on wall or partition section 48 are inwardly directed. In positioning plate 48 with relation to pipe element 49, it would be necessary to first place the lower flange 50 within the lower slot 51 and then the upper flange 50 and slot 51 in engagement.

Referring to Figs. 10-12, inclusive, the upper side of wall or plate member 36a may be provided with a flared edge 52 for dove-tail engagement with a groove 53 formed on the lower face 54 (by flanges 55) of a top plate or wall section 56, connected at one end to a beam 57 and its other end 58 being cutout to conform to the contour of the pipe element 30 and flanges 31.

As seen clearly in Fig. 11, the wall sections 36a and pipe element 30 constitute a closure partition clear across opening 58a between beams 57 in the direction of pipe element 30; while the plates 56 which join each other at 60 constitute a closure partition clear across the said opening 58a between beams 57 in a direction at a right angle to pipe element 30. There are preferably provided two sets of plates 56, one set at the floor line and the other set at the ceiling line of the beams, dove-tail joints being also provided at the junctures of the plates and wall members corresponding to the junctures at 43, 52, 55 in Fig. 11.

Fig. 13 shows an extendable wall section, which may be applied instead of wall section 36 (Fig. 3) (36a Fig. 11) or wall sections 56 (Fig. 11). The wall or plate member 36, 36a or 56, indicated in Fig. 13 by the numeral 80, is slidably engaged by the extension 81, the latter having the slot 82 formed by the bifurcations 83 and in which the member 80 is disposed. It is evident that by relative movement of members 80 and 81, the wall may be extended. Referring again to Fig. 9, it is evident that the plate or partition section 48 may be made up of relatively slidable parts to facilitate engagement of flanges 50 in slots 51.

Figs. 14 and 15 disclose the application of the invention to a typical T pipe fitting. The fitting 65 is provided with a plurality of flanges or extensions 66, each having bifurcated ends 67 forming substantially V-shaped slots 68 with inturned walls 69 adapted to receive complementary-ended wall members or partition sections 70.

Fig. 16 shows an application of the invention in another form, wherein the wall members or partitions 71 are provided with arcuate flanges 72 having faces corresponding to the contour of pipe element 73. Flanges 72 may be welded or otherwise secured to pipe element 73.

Fig. 17 discloses a typical cover 74 for the construction seen in Figs. 1 and 2, comprising the plate members 75, 76, a portion of one of the members (76) being seen in Fig. 18.

Plates 75, 76 serve the same purpose as plates 56 (Figs. 10, 11).

Fig. 18 illustrates a portion of one of these plates 76, which has a substantially arcuate cut-out 81, with slanting edge portions 82 and projection 83 conforming in contour with the contour formed by the angular flanges 33, 34 and slot or groove 39 formed thereby. It is evident that the plates 75, 76 may be positioned by engagement of projection 83 within the groove 39.

According to Figs. 19 and 20, wall or partition member 85 is provided with an offset end 86 adapted to engage within the groove 39 formed by the flanges 33, 34, thus permitting the plate 85 to be swung as indicated by the arrow in Fig. 19, to a position indicated in Fig. 20. When in this position, the offset portion 86 abuts against the inclined inner face of flange 34, thus preventing plate 85 from accidental withdrawal from groove 39. This pivotal arrangement of wall 85 permits of the latter being placed in adjusted position in cases where it might be difficult to apply the construction shown in Fig. 3.

According to Fig. 21, pipe element 90 is integrally provided with two extending flanges 91, each having the bifurcations 92, 93, between which is slidably receivable a partition or wall section or member (not shown). This means of connecting the partition wall sections to the pipe element may be employed in lieu of the connections shown in the previous figures, with the additional feature that the bifurcations 92, 93, form part of the partition and allows for extensibility of the connecting wall members in the event that the latter are not long enough to connect with, say for example, adjacent beams.

Fig. 23 shows a typical application of the construction seen in Figs. 1–3. The wall members or sections 36a respectively engage the beams 57a, and also the pipe element 30, each of the members 36a having an end flange similar to that indicated by the numeral 37 in Fig. 3a, a top view of which is seen in Fig. 3.

In Fig. 23, the floor line is indicated by the letter "F," and the ceiling line is indicated by the letter "C." In anyone of the manners shown and described in my copending application Serial No. 523,069, the horizontal plate sections 56a, 56b, may be applied at the floor and ceiling lines closing the opening between beams 57a from the top and bottom, while the vertical plate or wall members 36a and pipe element 30 constitute a partition assembly closing the passage in the opening in another direction.

Fig. 24 shows how the beam-engaging end of the partition plate member may be modified to fit across the channel of an I-beam. The plate member 98 has a reduced end with angular edges 100a to conform to the angular sides 101a of the channel 99 of the I-beam.

Fig. 22, discloses a partition wall member 95 having branches 96, 97, provided with flared ends to fit into appropriate grooves in pipe elements. This construction may be employed where there is a plurality of pipe elements in an opening and it is desired to accommodate the partition wall members with respect thereto. It is understood that as many branches in the same or different directions may be employed, as required to accomplish the object of closing the passage or passages around and or between pipes or other obstructions.

"Partition" appearing in the specification and/or claims includes a horizontal, vertical or angular plate or similar member, or any combination thereof.

From the foregoing description taken in connection with the accompanying drawings, it is apparent that improved, simple, practical and inexpensive devices for the purposes intended are provided. It is apparent, however, that changes and modifications may be made by skilled persons without departing from the true spirit and scope of the invention as outlined in the appended claims.

Having thus described my invention, what I claim as new and desire to secure by Letters Patent, is:

1. A pipe element having at least one projection adapted for engagement with a wall member to combine said element and said member into a unitary structure.

2. A pipe element having projections adapted for interlocking engagement with wall members to provide a device for closing a passage formed between elements in building construction.

3. A closure partition for an opening in a structure between beams or the like and through which opening an obstruction extends, said closure comprising said obstruction, plates, cooperating means on said obstruction and said plates for maintaining said plates and said obstruction in contiguous relation, said plates respectively being designed for engagement with said beams, and upper and lower plate members engaging said obstruction.

4. A closure partition for an opening in a structure having a member in said opening, comprising said member, wall elements, said wall elements being in abutting engagement with said member constituting therewith an assembly forming said partition, a plate member, said elements having means for locking engagement with said plate member when the latter is disposed at an angle with relation to said partition.

5. A partition for closing a passage through an opening in building or like construction, in which opening there is disposed a member; said partition comprising said member, wall sections engaging said member, said member having means for maintaining said sections in desired position whereby to constitute said member and said sections a complete assembly forming said partition.

6. A partition for closing a passage through an opening in building or like construction, in which opening there is disposed a member, said partition comprising said member, wall sections engaging said member, said sections and said member having cooperating means slidably interlocking for securing and maintaining said sections in desired positions so as to combine said member and said sections into a complete assembly forming said partition.

7. A device for closing a passage through an opening in building or like construction in which opening there is disposed a member, said device comprising said member, wall sections engaging said member and floor and ceiling plate elements, said floor and ceiling plate elements engaging said sections and being disposed at an angle with respect to said member, said member, said sections and said floor and ceiling plate elements constituting a complete assembly forming said device in said passage.

8. A device for closing a passage through an opening in a building or like construction in which opening there is disposed a member, said device comprising said member, at least one wall section engaging said member, said member and said section constituting an assembly forming a partition in said passage, and at least one plate member disposed at an angle with respect to said partition and engaging with said section.

9. A partition for closing a passage through an opening in a building or like construction, in which there is disposed a member; comprising said member, wall forming means positively engaging said member, and a wall section slidably engaging said wall forming means.

10. A partition for closing a passage through an opening in a building or like construction, in which there is disposed a pipe; comprising said pipe, wall forming means secured to said pipe and extending radially therefrom, and a wall section displaceable radially with respect to said pipe, said wall section slidably engaging said wall forming means whereby an extensible partition is provided.

ABRAHAM FISHKO.

REFERENCES CITED

The following references are of record in the file of this patent:

UNITED STATES PATENTS

| Number | Name | Date |
| --- | --- | --- |
| 1,278,895 | Farley | Sept. 17, 1918 |
| 1,690,297 | Hoge | Nov. 6, 1928 |
| 1,885,228 | Buchanan | Nov. 1, 1932 |
| 2,343,896 | Fishko | Mar. 14, 1944 |